(12) United States Patent
Bachman

(10) Patent No.: US 7,448,167 B2
(45) Date of Patent: *Nov. 11, 2008

(54) GUTTER AND ROOF PROTECTION SYSTEM

(76) Inventor: James E. Bachman, 729 N. 148th Ave., Omaha, NE (US) 68154

(*) Notice: Subject to any disclaimer, the term of this patent is extended or adjusted under 35 U.S.C. 154(b) by 526 days.

This patent is subject to a terminal disclaimer.

(21) Appl. No.: 11/069,299

(22) Filed: Mar. 1, 2005

(65) Prior Publication Data

US 2006/0196124 A1 Sep. 7, 2006

(51) Int. Cl.
*E04D 13/00* (2006.01)
(52) U.S. Cl. .................. 52/12; 52/11; 219/213
(58) Field of Classification Search .............. 52/11–15, 52/173.1; 219/213
See application file for complete search history.

(56) References Cited

U.S. PATENT DOCUMENTS

| | | | |
|---|---|---|---|
| 2,111,251 A * | 3/1938 | Spilsbury | 52/94 |
| 2,699,484 A * | 1/1955 | Michaels | 219/213 |
| 3,582,612 A | 6/1971 | Siemianowski | |
| 3,716,076 A | 2/1973 | Franzmeier | |
| 3,821,512 A | 6/1974 | Stanford | |
| 3,823,304 A | 7/1974 | Siemianowski | |
| 4,019,290 A | 4/1977 | Manty | |
| 4,028,895 A | 6/1977 | Franzmeier | |
| 4,043,527 A | 8/1977 | Franzmeier | |
| 4,081,657 A * | 3/1978 | Stanford | 219/213 |
| 4,249,767 A | 2/1981 | Andreasen | |
| 4,252,183 A | 2/1981 | Ricciardelli | |
| 4,254,595 A | 3/1981 | Crosslen | |
| 4,286,418 A | 9/1981 | Snyder | |
| 4,291,673 A | 9/1981 | Deutz | |
| 4,300,319 A | 11/1981 | Frost et al. | |
| 4,308,696 A | 1/1982 | Schroeder | |
| 4,335,299 A | 6/1982 | Belohlavek | |
| 4,375,805 A | 3/1983 | Weber | |

(Continued)

FOREIGN PATENT DOCUMENTS

JP 52146944 12/1977

(Continued)

OTHER PUBLICATIONS

JP2001140418 patent abstract, May 2001.*
www.river2u.com/home_improvement/gutters.htm.
www.heatizon.com/index.php/products?

*Primary Examiner*—Brian Glessner
*Assistant Examiner*—James J Buckle, Jr.
(74) *Attorney, Agent, or Firm*—Hovey Williams LLP

(57) ABSTRACT

A gutter and roof protection system comprises a gutter cover and an attached heating element. The gutter cover is installed between a lower edge of a sloped roof and a gutter attached to the roof. The gutter cover includes at least one elongated slot. The heating element is placed within the elongated slot and then connected to a suitable source of electricity so as to melt snow and ice which accumulates on or near the gutter cover. The slot retains the heating element and prevents it from moving without the use of fasteners. The slot also positions the heating element so that it is generally flush relative to a surface of the gutter cover so the heating element doesn't impede the flow of water or collect debris.

13 Claims, 4 Drawing Sheets

U.S. PATENT DOCUMENTS

| | | | | |
|---|---|---|---|---|
| 4,395,852 | A | 8/1983 | Tang | |
| 4,401,880 | A | 8/1983 | Eizenhoefer | |
| 4,404,775 | A | 9/1983 | Demartini | |
| 4,432,341 | A | 2/1984 | Howe et al. | |
| 4,435,925 | A | 3/1984 | Jefferys | |
| 4,445,301 | A | 5/1984 | Tanski | |
| 4,447,994 | A | 5/1984 | Garneau | |
| 4,462,390 | A | 7/1984 | Holdridge et al. | |
| 4,497,146 | A | 2/1985 | Demartini | |
| 4,586,298 | A | 5/1986 | Colp | |
| 4,590,730 | A | 5/1986 | Blendick | |
| 4,667,448 | A | 5/1987 | Smith | |
| 4,741,645 | A | 5/1988 | Butler | |
| 4,763,450 | A | 8/1988 | Daniel | |
| 4,769,526 | A | 9/1988 | Taouil | |
| 4,796,390 | A | 1/1989 | Demartini | |
| 4,805,323 | A | 2/1989 | Motohashi | |
| 4,807,406 | A | 2/1989 | Densmore | |
| 5,189,849 | A | 3/1993 | Collins | |
| 5,303,517 | A | 4/1994 | Schneider | |
| 5,333,417 | A | 8/1994 | Demartini | |
| 5,343,664 | A | 9/1994 | Loucks | |
| 5,391,858 | A | 2/1995 | Tourangeau et al. | |
| 5,440,855 | A | 8/1995 | Loucks | |
| 5,459,965 | A | 10/1995 | Meckstroth | |
| 5,473,847 | A | 12/1995 | Crookston | |
| 5,503,219 | A | 4/1996 | Bortugno | |
| 5,526,626 | A | 6/1996 | Loucks | |
| 5,537,785 | A | 7/1996 | Zaccagni | |
| 5,557,891 | A | 9/1996 | Albracht | |
| 5,638,643 | A | 6/1997 | Demartini et al. | |
| 5,660,001 | A * | 8/1997 | Albracht | 52/12 |
| 5,737,879 | A | 4/1998 | Sweet | |
| 5,740,636 | A | 4/1998 | Archard | |
| 5,786,563 | A | 7/1998 | Tiburzi | |
| 5,836,344 | A | 11/1998 | Hovi, Sr. | |
| 5,878,533 | A | 3/1999 | Swanfeld, Jr. | |
| 5,890,324 | A | 4/1999 | Maanum | |
| 5,900,178 | A | 5/1999 | Johnsen | |
| 5,953,861 | A | 9/1999 | Podgwaite | |
| 5,960,590 | A | 10/1999 | Hutchison | |
| 5,988,074 | A | 11/1999 | Thoman | |
| 6,035,587 | A | 3/2000 | Dressler | |
| 6,067,755 | A | 5/2000 | Maanum | |
| 6,087,630 | A | 7/2000 | Miller et al. | |
| 6,098,344 | A * | 8/2000 | Albracht | 52/12 |
| 6,098,345 | A | 8/2000 | Demartini et al. | |
| 6,134,843 | A | 10/2000 | Tregear | |
| 6,151,836 | A | 11/2000 | McGlothlin et al. | |
| 6,166,352 | A | 12/2000 | Turton | |
| 6,225,600 | B1 | 5/2001 | Burris | |
| 6,282,846 | B1 | 9/2001 | Nocella | |
| 6,401,424 | B2 | 6/2002 | Folkersen | |
| 6,463,700 | B2 | 10/2002 | Davis | |
| 6,598,352 | B2 | 7/2003 | Higginbotham | |
| 6,668,491 | B1 | 12/2003 | Bonerb | |
| 6,694,678 | B2 | 2/2004 | Schneider | |
| 6,700,098 | B1 | 3/2004 | Wyatt et al. | |
| 6,708,452 | B1 * | 3/2004 | Tenute | 52/11 |
| 6,759,630 | B1 * | 7/2004 | Tenute | 219/213 |
| 6,959,512 | B2 * | 11/2005 | Cobb | 52/12 |
| 6,978,577 | B2 * | 12/2005 | Jones | 52/11 |
| 7,104,012 | B1 * | 9/2006 | Bayram | 52/12 |
| 2006/0213129 | A1 * | 9/2006 | Bachman | 52/11 |
| 2006/0277831 | A1 * | 12/2006 | Bachman | 52/11 |

FOREIGN PATENT DOCUMENTS

| | | |
|---|---|---|
| JP | 52146945 | 12/1977 |
| JP | 02204561 | 8/1990 |
| JP | 03147986 | 6/1991 |
| JP | 05052007 | 3/1993 |
| JP | 08218575 | 8/1996 |
| JP | 10183897 | 7/1998 |
| JP | 00038817 | 2/2000 |
| JP | 00257039 | 9/2000 |
| JP | 00282636 | 10/2000 |
| JP | 03013567 | 1/2003 |
| JP | 03268941 | 9/2003 |
| WO | 9622567 A1 | 7/1996 |
| WO | 9841789 A1 | 9/1998 |
| WO | 2004063488 A1 | 7/2004 |

* cited by examiner

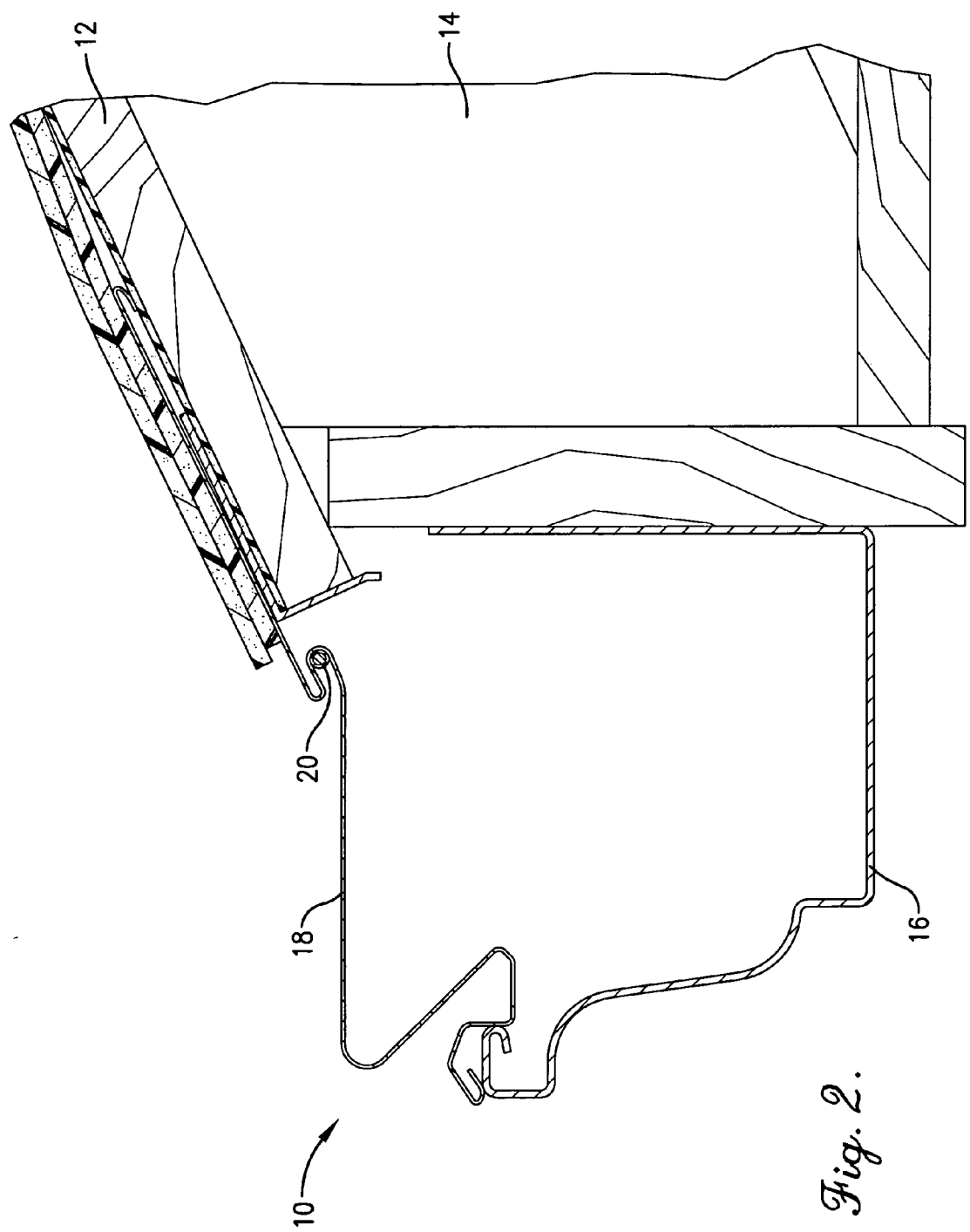

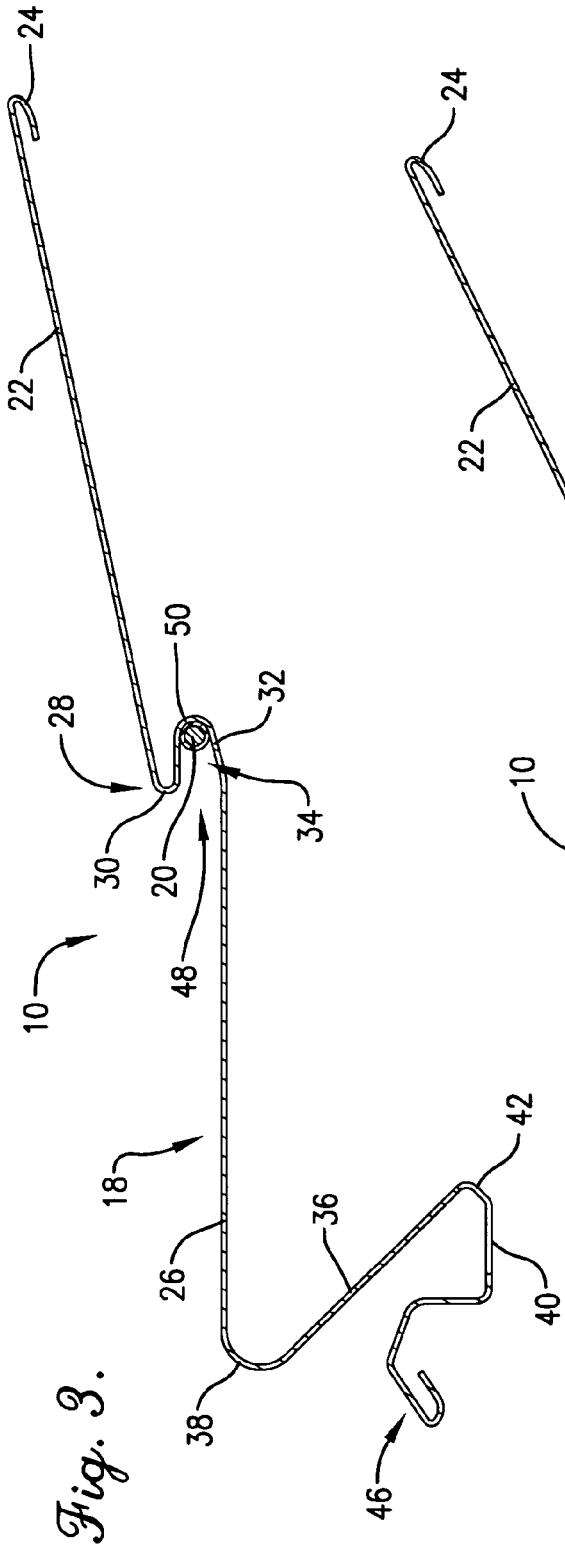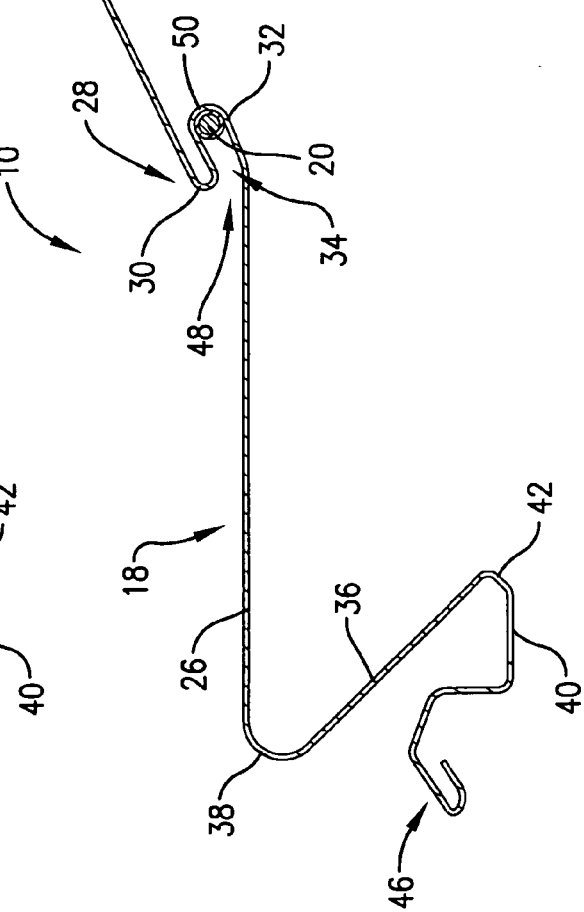

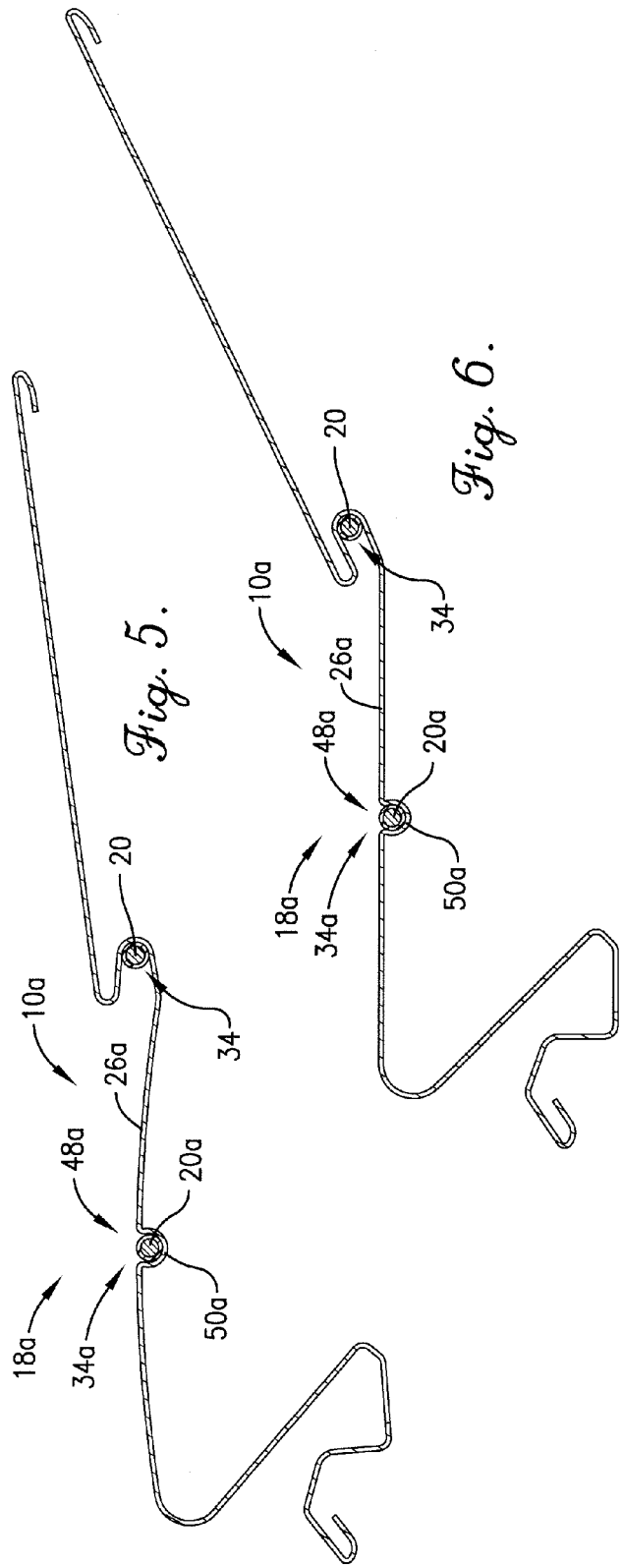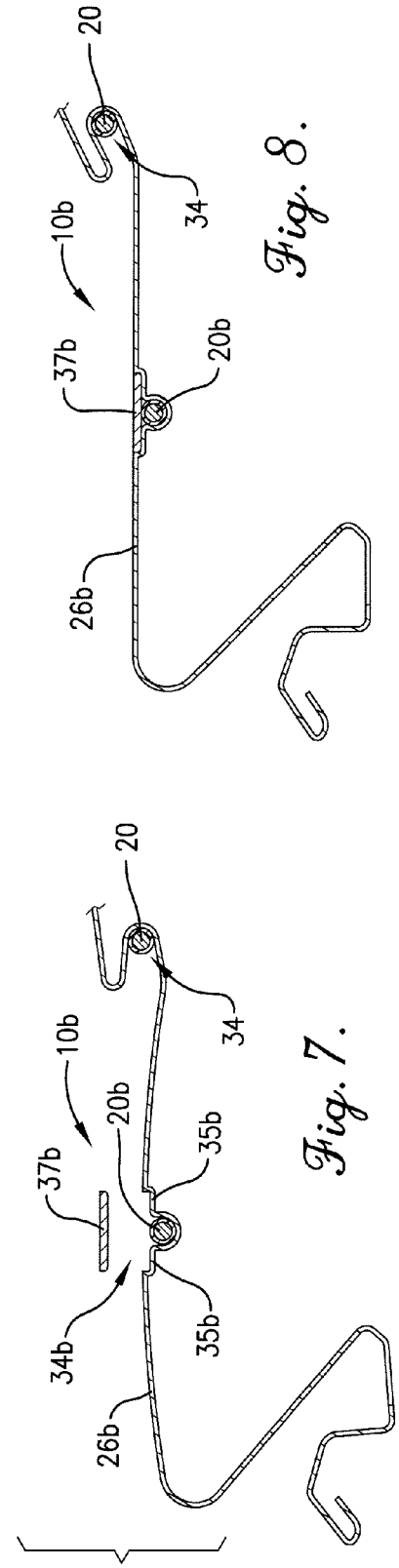

GUTTER AND ROOF PROTECTION SYSTEM

BACKGROUND OF THE INVENTION

1. Field of the Invention

The present invention relates to gutters, gutter covers, and ice and snow melting systems. More particularly, the invention relates to a gutter and roof protection system with an attached heating element.

2. Description of the Prior Art

Gutters are often installed on houses and other buildings to collect and carry water away from roofs and other sloped surfaces. Unfortunately, gutters often become clogged with leaves, twigs, and other debris, thus limiting their ability to collect water. Clogged gutters can also overflow, causing water damage to fascia and soffits of the buildings to which they are attached. Gutter covers, such as the ones described in U.S. Pat. Nos. 5,557,891; 5,660,001; and 6,098,344 have been developed to alleviate these problems.

Roofs and other sloped surfaces are also subject to the accumulation of snow and ice, especially on eaves and overhangs which are not positioned over heated areas. Accumulated snow and ice can cause "ice dams" on roofs, gutters, and gutter covers which interfere with the normal shedding and collection of water. As water backs up behind an ice dam, it can flow through small cracks in shingles or other roofing material. Over prolonged periods of time, the freezing and subsequent thawing cycle of the water expands these cracks, eventually damaging the roof and underlying materials. Such ice dams also often break away and fall to the ground, potentially causing injury to persons and damage to property below.

Heating cables and other de-icing products can be placed on roofs, gutter covers and/or gutters to melt snow and ice before it accumulates and forms ice dams. However, heating cables must be fastened with staples, nails or other fasteners or they will move over time and require repositioning. Use of such fasteners creates holes in the roofs and/or gutters, resulting in damage due to water infiltration and the subsequent freezing and thawing described above. This placement of heating cables on top of roof shingles and gutters also creates an impediment to the normal flow of water and can trap leaves and other debris.

Heating cables and other de-icing products can be installed underneath roof shingles to avoid some of the above-described problems, but doing so requires a great deal of labor, especially for existing roofs. Covering heating cables with shingles also reduces their ability to melt snow and ice and increases the risk of fires.

SUMMARY OF THE INVENTION

The present invention solves the above-described problems and provides a distinct advance in the art of gutter covers and heating cables. More particularly, the present invention provides a gutter and roof protection system which more effectively and efficiently prevents the clogging of gutters and the formation of ice dams.

The gutter and roof protection system of the present invention comprises a gutter cover and an attached heating element. The gutter cover is installed between a lower edge of a sloped roof and a gutter attached to the roof. The gutter cover includes at least one elongated slot. The heating element is placed within the elongated slot and then connected to a suitable source of electricity so as to melt snow and ice which accumulates on or near the gutter cover. The slot retains the heating element and prevents it from moving, without the use of fasteners. The slot also positions the heating element so that it is generally flush relative to a surface of the gutter cover so the heating element doesn't impede the normal flow of water or collect debris.

In one embodiment, the heating element is a heating cable, and the elongated slot is formed by an S-bend between first and second surfaces of the gutter cover. The opening of the slot is enlarged by bending the first and second surfaces in a first direction so as to receive the heating cable therein. The opening of the slot is then subsequently at least partially closed by bending the first and second sections of the gutter cover in a second, opposite direction to retain the heating cable in the slot.

In another embodiment, the elongated slot is formed in the second surface of the gutter cover. In yet another embodiment, the gutter cover includes both the elongated slot formed by the S-bend and the elongated slot in the second surface, with a heating cable in each slot.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 2 is a partial vertical section view of the gutter and roof protection system of FIG. 1 and the roof and gutter to which it is attached.

FIG. 3 is a vertical section view of the gutter and roof protection system of FIG. 1 showing the gutter cover manipulated so as to permit insertion of the heating cable.

FIG. 4 is a vertical section view of the gutter and roof protection system of FIG. 1 showing the gutter cover manipulated so as to retain and prevent relative movement of the heating cable.

FIG. 5 is a vertical section view of a gutter and roof protection system constructed in accordance with another preferred embodiment of the invention comprising a gutter cover and a heating cable and showing the gutter cover manipulated so as to permit insertion of the heating cable.

FIG. 6 is a vertical section view of the gutter and roof protection system of FIG. 5 showing the gutter cover manipulated so as to retain the heating cable.

FIG. 7 is a partial vertical section view of a gutter and roof protection system constructed in accordance with another preferred embodiment of the invention comprising a gutter cover and a heating cable and showing the gutter cover manipulated so as to permit insertion of the heating cable.

FIG. 8 is a vertical section view of the gutter and roof protection system of FIG. 7 showing the gutter cover manipulated so as to retain the heating cable.

Figure 1:
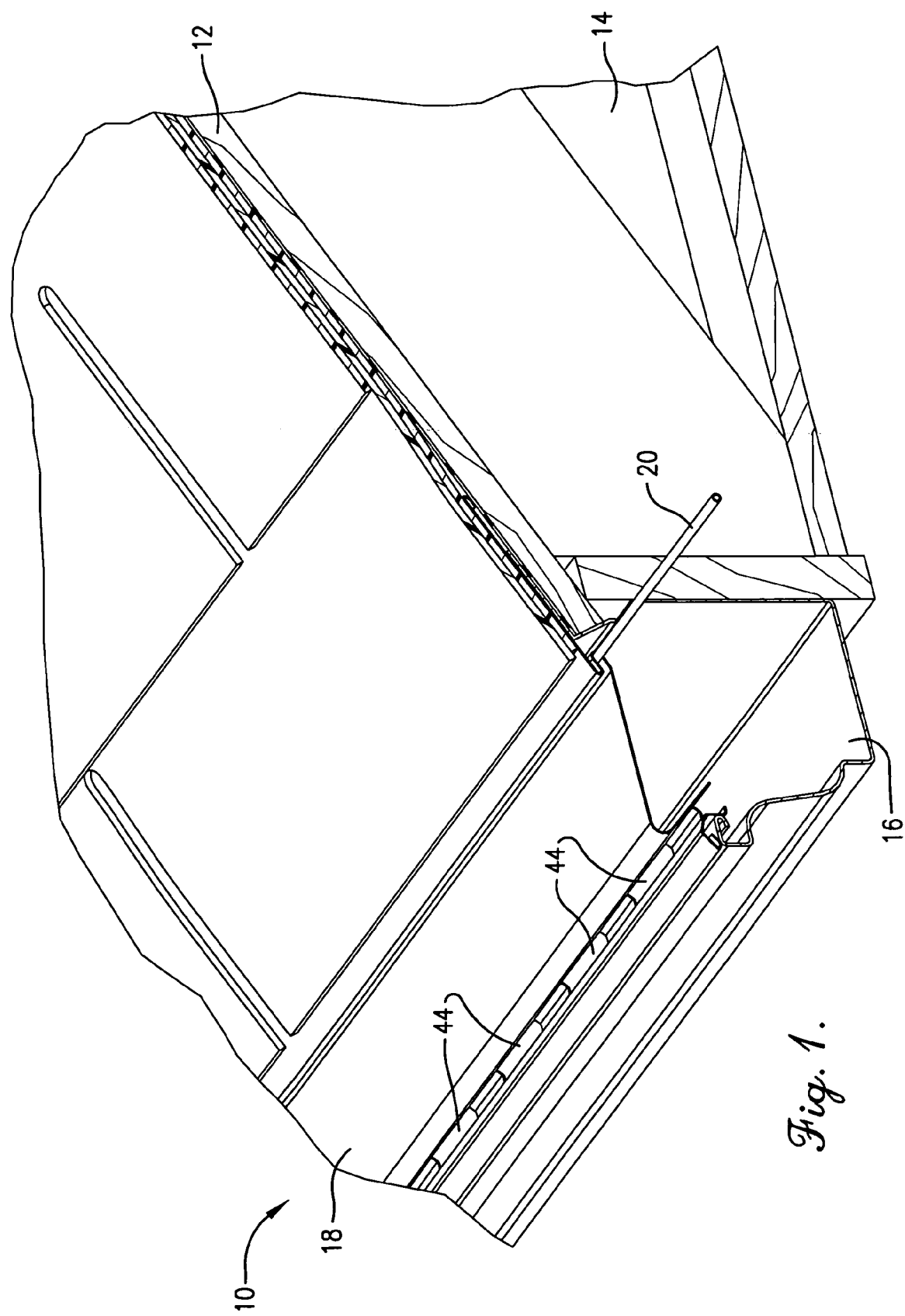
FIG. 1 is a fragmentary perspective view of a gutter and roof protection system comprising a gutter cover and a heating cable constructed in accordance with a preferred embodiment of the present invention and shown installed between a roof of a building and a gutter attached to the building.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

FIGS. 1-4 illustrate a gutter and roof protection system 10 constructed in accordance with a preferred embodiment of the present invention. As best illustrated in FIGS. 1 and 2, the gutter and roof protection system 10 is adapted to be installed between a roof or other sloped surface 12 of a building 14 and a gutter system 16 affixed below a lower surface of the roof.

The gutter and roof protection system 10 broadly includes a gutter cover 18 and a heating element 20, such as a length of ice and snow melting cable (also referred to herein as "heating cable"), installed on the gutter cover 18 as described in more detail below. The gutter and roof protection system 10 may also include one or more mounting brackets for affixing the gutter cover to the gutter, one or more end caps for capping the ends of the gutter cover, and one or more diverter elements for use at converging sloped roof locations.

The gutter cover 18 is designed to collect water from the roof 12 and to direct it into the gutter 16 while preventing leaves and other debris from entering the gutter 16. The gutter cover 18 may be of various shapes and sizes to fit over different sizes and styles of gutters. Preferred examples of the gutter cover 18 are described in detail in U.S. Pat. Nos. 5,557, 891; 5,660,001; and 6,098,344, all incorporated into the present application by reference. These patents also disclose in more detail the end caps and diverter elements mentioned above.

In general, the gutter cover 18 includes a number of individual segments which can be interconnected to cover any length of gutter. In one embodiment, each segment is approximately four feet long and includes one end which can slide into an end of an adjacent segment so a plurality of segments can be interconnected to cover a long length of gutter without the use of screws, brackets, or other fasteners joining the segments together.

Each gutter cover segment 18 is preferably formed from a single piece of aluminum or other suitable material which is bent into the configuration shown in the drawing figures. If the gutter cover 18 is formed of aluminum, the preferred thickness of each segment is preferably between $\frac{1}{32}$" and $\frac{1}{16}$".

Turning to FIGS. 3 and 4, each gutter cover segment 18 includes a first, generally planar section 22, which is adapted to be installed under a first row of shingles on the roof (see FIGS. 1 and 2) without the use of nails, screws, staples or other fasteners. The first section 22 slopes downwardly from right to left when viewed from the perspective of FIGS. 3 and 4 so as to match the pitch of the roof 12. The angle of the first section 22 can be changed as described in the above-referenced patents to match the slope of the roof 12 or other sloped surface to which it is attached. The first section 22 includes a lip 24 formed by a generally 180° bend in the rightmost end of the first section that resists movement of the first section once it is installed under the roof shingles.

Each gutter cover segment 18 also includes a generally planar second section 26 joined to the first section by a bend 28. The second section 26 is adapted to overlie the open end of the gutter 16 when installed and slopes gradually from right to left so as to direct water away from the roof 12, over the left edge of the second section 26, and into the gutter 16.

The bend 28 includes an upper, approximately 180° C.-shaped portion 30 which opens to the right as viewed in FIGS. 3 and 4 and a lower, approximately 180° C.-shaped portion 32 which opens to the left. The upper 30 and lower 32 portions of the bend together present a generally S-shape. The bend 28 performs several important functions. First, it permits the angle of the first section 22 of the gutter cover to be adjusted relative to the second section 26 so as to match the pitch of the roof 12 to which the gutter cover 18 is attached. Second, the bend 28 slows the flow of water from the roof 12 to the second section 26 by reversing the water flow through capillary action. Through capillary action, water flowing over the bend 28 follows along the surface of the bend and reverses direction rather than spilling over the bend. Third, and in accordance with one aspect of the invention, the bend 28 presents an elongated slot 34 for receiving and retaining the heating element 20 as described in more detail below.

Each gutter cover segment 18 also includes a generally planar third section 36 joined to the second section by a bend 38. The bend 38 preferably has an obtuse angle so that the third section 36 slopes downwardly and inwardly relative to the leftmost edge of the second section 26. As with the bend 28, the bend 38 and the third section 36 serve to reverse and slow the flow of water over the gutter cover through capillary action.

Each gutter cover segment 18 also includes a generally planar fourth section 40 joined to the third section 36 by a bend 42. The bend 42 preferably has an acute angle that, when summed with the angle of the bend 38, equals approximately 180°, so that the fourth section 40 is generally parallel with the second section 26. That is, the fourth section 40 has a slight downward slope from right to left. For example, the bend 38 may have an angle of approximately 120° and the bend 42 may have an angle of approximately 60°.

As best illustrated in FIG. 1, a series of spaced-apart holes or cutouts 44 are formed in the fourth section 40 to direct water from the gutter cover 18 into the underlying gutter 16.

Each gutter cover segment 18 also includes a leftmost lip or hem section 46 joined to the left edge of the fourth section 40. The lip 46 is connected to the front upper edge of the gutter by the mounting brackets mentioned above or other fasteners.

The heating element 20 is itself conventional and is operable to emit heat when connected to a suitable source of electricity. An example of a heating element 20 that may be used with the present invention is the Tuff brand heating cable manufactured and sold by Heatizon Systems of Salt Lake City, Utah. The preferred heating cable 20 is a 10 gauge coated copper cable that is weather and chemical resistant. The heating cable 20 is connected to a suitable transformer and control box, such as those provided by Heatizon, to provide low-voltage electricity for delivering up to 12 watts of heat per lineal foot of heating cable. The control box may also include or be connected to an activation device, such as those provided by Heatizon, to control when electricity is delivered to the heating cable (for example, only during cold days).

In accordance with one aspect of the present invention, the elongated slot 34 formed by the bend 28 receives and retains the heating cable 20 therein. Specifically, the elongated slot 34 is formed by the lower portion 32 of the bend. The elongated slot 34 presents an opening 48 and a closed end 50. The opening 48 can be manipulated to initially receive the heating cable 20 and then hold it in place as described below. The closed end 50 is sized to snugly receive the cable 20 and position it inward (to the right when viewed from FIGS. 3 and 4) of the leftmost edge of the first section 22 of the gutter cover. This permits the heating cable 20 to heat the area of the gutter cover 18 adjacent the bend 28 to melt any accumulated snow and ice while preventing the heating cable 20 from obstructing the flow of water over the first 22 or second 26 sections of the gutter cover 18. Placing the heating cable 20 within the bend 28 also prevents it from trapping leaves or other debris on the gutter cover 18. The elongated slot 34 formed by the bend 28 also prevents the cable 20 from inadvertently moving after it has been installed, without the use of additional fasteners such as staples or screws.

FIGS. 3 and 4 illustrate the insertion of the heating cable 20 within the elongated slot 34. As illustrated in FIG. 3, the first section 22 of the gutter cover is first bent downwardly, or clockwise, relative to the second section 26 of the gutter cover to widen the opening 48 in the elongated slot 34. The heating cable 20 is then inserted through the opening 34 and pushed against the closed end 50 of the elongated slot 34. Once the heating cable 20 is positioned within the elongated slot 34, the first section 22 of the gutter cover is bent upwardly, or counterclockwise, relative to the second section 26 of the gutter cover to partially or fully close the opening 34 in the elongated slot and prevent the heating cable from moving out of the slot. Once the first section 22 is bent to retain the heating cable 20 in the elongated slot 34, it may be bent further to match the particular pitch of the roof 12 to which the gutter cover 18 is affixed.

FIGS. 5 and 6 illustrate a gutter and roof protection system 10a constructed in accordance with another preferred embodiment of the present invention. The gutter and roof protection system 10a is identical to the gutter and roof protection system 10 of FIG. 14 except that it includes an elongated, generally U-shaped slot 34a in the second section 26a of the gutter cover 18a. The elongated slot 34a receives and retains the heating cable 20a and is sized so that the top edge of the heating cable is essentially flush with the top edge of the second section 26a of the gutter cover. For example, in one embodiment, the slot is approximately ⅛" deep and wide so as to receive and flushly secure an approximate ⅛" diameter heating cable. This permits the heating cable 20a to heat the second section 26a of the gutter cover to melt any accumulated snow and ice while preventing the heating cable from obstructing the flow of water over the gutter cover. Flush-mounting the heating cable 20a within the elongated slot 34a also prevents it from trapping leaves or other debris on the gutter cover. The elongated slot 34a also prevents the heating cable 20a from moving, without the use of staples, screws or other fasteners.

FIGS. 5 and 6 also illustrate the insertion of the heating cable 20a within the elongated slot 34a. As illustrated in FIG. 5, both the left and right sides of the second section 26a of the gutter cover are initially bent downwardly to widen the opening 48a in the elongated slot 34a. The heating cable 20a is then inserted through the opening 48a and pushed against the closed end 50a of the elongated slot. Once the heating cable 20a is positioned in the elongated slot 34a, the left and right portions of the second section 26a of the gutter cover are bent upwardly to at least partially close the opening 48a in the elongated slot 34a and prevent the heating cable 20 from coming out of the slot.

FIGS. 7 and 8 illustrate a gutter and roof protection system 10b constructed in accordance with another preferred embodiment of the invention. The gutter and roof protection system 10b is identical to the gutter and roof protection system 10a illustrated in FIGS. 5 and 6 except that it includes an elongated U-shaped slot 34b in the second section 26b of the gutter cover and recessed shoulder regions 35b on both sides of the elongated slot. The heating cable 20b is inserted in the elongated slot 34b in the same manner as described above. After the heating cable is installed, an elongated cover 37b, having a thickness approximately equal to the depth of the recessed shoulders 35b, is placed over the elongated slot 34b and shoulder regions 35b so as to cover the heating cable 20b. The cover 37b, which may be formed of aluminum, plastic, nylon, or any other suitable material, may be attached with adhesives or other fasteners or may be retained by friction or a snap-fit. Once installed, the top surface of the cover 37b is entirely flush with the top surface of the second section 26b of the gutter cover so it doesn't impede the flow of water thereover or trap leaves or other debris.

In yet another embodiment of the invention, the gutter cover may include both the elongated slot 34 and heating cable 20 of FIGS. 1-4 and the elongated slot 34a and heating cable 20a of FIGS. 5 and 6. In yet another embodiment of the invention, the gutter cover may include both the elongated slot 34 and heating cable 20 of FIGS. 1-4 and the elongated slot 34, shoulders 35b, heating cable 20b and the cover 37b of FIGS. 7 and 8.

Although the invention has been described with reference to the preferred embodiment illustrated in the attached drawing figures, it is noted that equivalents may be employed and substitutions made herein without departing from the scope of the invention as recited in the claims.

The invention claimed is:

1. A gutter and roof protection system comprising:
   a gutter cover affixed between a lower edge of a sloped roof and a gutter attached to the roof, the gutter cover including
      a generally planar first section installed under shingles on the roof,
      a generally planar second section overlying the gutter, and
      an elongated slot formed below the planar portion in the second section, wherein the first section, the second section, and the slot are integrally formed from a single piece of material; and
   a heating element for placement in the slot, such that a top edge of the heating element is essentially flush with a top edge of the second section and the top edge of the heating element is exposed while the heating element lies in the slot, for melting snow and ice which accumulates on the gutter cover.

2. The gutter and roof protection system as set forth in claim 1, the gutter cover including a bend which couples the first section to the second section and which defines a second elongated slot.

3. The gutter and roof protection system as set forth in claim 2, wherein the bend includes an upper bend joined to a lower bend which together are generally S-shaped in cross-section.

4. The gutter and roof protection system as set forth in claim 3, wherein the second elongated slot is formed by the lower bend.

5. The gutter and roof protection system as set forth in claim 2, wherein the first section, the second section and the bend are integrally formed of a single piece of material.

6. The gutter and roof protection system as set forth in claim 1, wherein the elongated slot has an opening for receiving the heating element and a closed end for retaining the heating element in the elongated slot.

7. The gutter and roof protection system as set forth in claim 6, wherein the second section of the gutter cover can be bent to widen the opening of the elongated slot to permit insertion of the heating element therein.

8. The gutter and roof protection system as set forth in claim 1, wherein the heating element is a heating cable.

9. A gutter and roof protection system comprising:
   a gutter cover affixed between a lower edge of a sloped roof and a gutter attached to the roof, the gutter cover including a generally planar first section which can be installed under shingles on the roof, a generally planar second section which overlies the gutter, and a bend which couples the first section to the second section and which presents a first elongated slot;
   a second elongated slot formed below the planar portion in the second section, wherein the first section, the second section, the first slot, and the second slot are integrally formed from a single piece of material;
a first heating cable for placement in the first elongated slot for melting snow and ice which accumulates on or near the gutter cover; and
a second heating cable for placement in the second elongated slot, such that a top edge of the second heating cable is essentially flush with a top edge of the second section and the top edge of the second heating cable is exposed while the second heating cable lies in the second slot, for melting snow and ice which accumulates on or near the gutter cover.

10. The gutter and roof protection system as set forth in claim 9, wherein the second elongated slot has a depth approximately equal to a diameter of the heating cable so the heating cable is generally flush-mounted in the slot so the heating cable doesn't block flow of water over the second section of the gutter.

11. A method of installing a gutter cover on a gutter attached to a sloped surface of a building, the method comprising the steps:
obtaining a length of the gutter cover having a generally planar first section, a generally planar second section, a bend which couples the first, section to the second section, the bend defining a first elongated slot having an opening, and a second elongated slot, with an opening, located along the length of the second section and below the planar portion of the second section;
bending the gutter cover about the bend in a first direction to enlarge the opening of the first elongated slot;
inserting a first heating cable in the opening of the first elongated slot;
bending the gutter cover about the bend in a second direction generally opposite the first direction to at least partially close the opening of the first elongated slot so as to retain the first heating cable within the first elongated slot;
bending the sides of the second section downwardly to enlarge the opening of the second elongated slot;
inserting a second heating cable in the opening of the second elongated slot;
bending the sides of the second section upwardly to at least partially close the opening of the second elongated slot, and leave an exposed portion along the top of the second heating cable; and
installing the gutter cover on the gutter.

12. The method as set forth in claim 11, wherein the gutter cover is installed on the gutter by inserting the first section at least partially under a row of shingles on the sloped surface and connecting the second surface over the gutter.

13. The gutter and roof protection system as set forth in claim 2, further including a second heating element for placement in the second elongated slot.

* * * * *